| (12) | United States Patent | (10) Patent No.: | US 6,334,695 B1 |
|---|---|---|---|
| | Abe et al. | (45) Date of Patent: | Jan. 1, 2002 |

(54) EMBEDDED-TYPE LIGHT

(75) Inventors: Yoichi Abe; Shoichi Kameta; Katsuhiko Hagiwara; Shunji Kawabata, all of Narita; Ryoichi Sato, Higashihiroshima, all of (JP)

(73) Assignee: New Tokyo International Airport Authority, Chiba (JP)

( * ) Notice: Subject to any disclaimer, the term of this patent is extended or adjusted under 35 U.S.C. 154(b) by 0 days.

(21) Appl. No.: 09/622,516

(22) PCT Filed: Dec. 16, 1999

(86) PCT No.: PCT/JP99/07072

§ 371 Date: Oct. 6, 2000

§ 102(e) Date: Oct. 6, 2000

(87) PCT Pub. No.: WO00/36223

PCT Pub. Date: Jun. 22, 2000

(30) Foreign Application Priority Data

Dec. 17, 1998 (JP) .......................................... 10-359845

(51) Int. Cl.$^7$ ................................................. E01F 9/00
(52) U.S. Cl. ..................... 362/153.1; 362/365; 362/369; 404/9
(58) Field of Search ............................. 362/153.1, 153, 362/364, 365, 369; 404/9

(56) References Cited

U.S. PATENT DOCUMENTS 5,390,090 A * 2/1995 Nau .......................... 362/153.1
5,779,349 A * 7/1998 Reinert, Sr. ............... 362/153.1

FOREIGN PATENT DOCUMENTS

| JP | 59-50703 | 4/1984 |
| JP | 3-84108 | 4/1991 |
| JP | 9-209320 | 8/1997 |

* cited by examiner

Primary Examiner—Stephen Husar
(74) Attorney, Agent, or Firm—Rosenthal & Osha L.L.P.

(57) ABSTRACT

In an inset light 1 comprising a cylindrical base 3 installed in a PC pavement 2, and a lamp body 5 held in the upper part of the base 3 for emitting light outside of the pavement surface, protruded deformations 6 are formed on the outer circumference of the base 3 so as to receive the load applied on the lamp body 5 from above at the PC pavement 2 around the base 3. As a result, concentration of load in the lower part of the base 3 is prevented. Further, to alleviate the prestress shortage of the PC pavement in the lower part of the base 3, a shock absorber 7 is provided in the lower end outer peripheral edge of the base 3. As a result, lowering of strength of the PC pavement 2 in the lower part of the base 3 is suppressed. Accordingly, if a heavy load of aircraft or the like is applied, the inset light capable of preventing sinking while suppressing brittleness of the PC pavement in the lower portion of the base can be presented.

19 Claims, 3 Drawing Sheets

EMBEDDED-TYPE LIGHT

TECHNICAL FIELD

The present invention relates to an improvement of installed objects such as inset lights installed inside the concrete pavement, for example, runway, taxiway, apron and road in an airport, and more particularly to inset lights and other objects installed inside the prestressed concrete pavement.

BACKGROUND ART

A conventional inset light (or marker light) has a structure as shown in FIG.6. This inset light 30 is installed inside, for example, the runway in an airport, and is roughly composed of a cylindrical base 32 installed inside a prestressed concrete pavement (hereinafter called PC pavement) 31, and a lamp body 34 mounted on the base 32 through (using) a lamp body holding member 33 called adjusting ring. The inset light 30 can be easily installed inside the PC pavement 31 by placing concrete after arranging it among with the conduit pipe, PC steel materials, the parts of PC pavement and others at specified position on the existing pavement surface.

In the above-mentioned inset light 30, however, since the outer circumference of the base 32 is a flat cylindrical body, the coupling force (engagement) between the outer circumference of the base 32 and the PC pavement 31 is not strong by nature. When a heavy load of aircraft or the like is applied on the top of the lamp body 34, since the resistance between the cylindrical outer circumference of the base 32 and the PC pavement 31 is small, the load is concentrated in the lower part of the base 32. As the load exceeding the strength of the PC pavement 31 at the lower side of the base 32 is applied from the bottom of the base 32, the concrete portion of the lower side of the base may be broken, and the lighting fixture is likely to sink.

At this time, in the PC pavement 31 beneath the base 32, simultaneously with the load pressure acting directly from the lower side of the base 32, a normal stress for direction of bottom (shearing force) acts from the edge portion at the lower end of the base 32. Therefore, when a heavy load of aircraft or the like repeatedly acts on the inset light 30, the portion of the PC pavement 31 supporting the base 32 may be cracked in a short period and be brittle, thereby sinking the inset light 30.

A first object of the invention is to present an inset light capable of preventing concentration of the load beneath the base of the inset light if a heavy load of aircraft or the like is applied, by oppressing the outer circumference of the base 32 by utilizing effectively the prestress applied to the PC pavement 31, and raising the coupling force with the PC pavement 31.

As indicated by arrow $S_0$, the prestress from the PC pavement 31 acts to oppress the outer circumference of the base 32, but the prestress applied to oppress the outer circumference of the base 32 of which rigidity is larger than that of the PC pavement 31 is canceled by the replusive force of the outer circumference of the base (binding force= canceling force in the opposite direction). Accordingly, the bonding force with the PC pavement is lowered, and the base holding force by the PC pavement drops. Moreover, since the replusive force of the base 32 has a component in a direction of canceling the prestress of the PC pavement 31, shortage of prestress of the PC pavement 31 occurs in the lower side portion of the base 32, that is, in the portion of supporting the load applied to the base 32. Since the PC pavement 31 maintains the concrete strength by a predetermined prestress, if the prestress is insufficient, the strength declines. However, the outer circumference of the base 32 which is a cylindrical body with a bottom is made of a metal plate 32a, and is deformed somewhat in the plate thickness direction due to stress from the direction intersecting with the plate surface, the reduction of stress force is smaller than in the lower edge of the base.

By contrast, the lower edge of the base corresponds to the outer peripheral edge of the bottom plate 32b, and is the most rigid portion that is hardly deformed, and it overcomes the prestress $S_0$ from the above-mentioned direction, and cancels the prestress from the PC pavement. Thus, by the replusive force of the lower edge of the base 32, the prestress acting on the PC pavement positioned beneath the bottom of the base is decreased, and the concrete strength in the area declines. In this state, when a heavy load is applied to the top of the lighting fixture from aircraft or the like, the PC pavement portion positioned beneath the base is cracked by the bending stress, and finally the inset light 30 sinks and troubles are likely to occur.

It is a second object of the invention to present an inset light capable of preventing lowering of strength in the concrete portion positioned beneath the base, while effectively enhancing the bonding force between the base and the PC pavement, by minimizing the region of cancellation of prestress due to constraint of the prestress on the outer circumference by the base for composing the inset light installed inside the PC pavement, so that the prestress may act more effectively on the entire base.

DISCLOSURE OF THE INVENTION

To achieve the objects, a first embodiment of the invention relates to an inset light comprising a cylindrical base installed inside a prestressed concrete (PC) pavement, and a lamp body held on the top of the base for emitting light out to the pavement surface, in which protruded deformations are formed on the outer circumference of the base in order to receive the load applied on the lamp body from above at the PC pavement around the base.

In a second embodiment of the invention, the protruded deformations have a function of dispersing the stress generated downward from the lower edge of the base by the load applied on the lamp body from above.

In a third embodiment of the invention, the protruded deformations are disposed at specific pitches along the axial direction of the base.

In a fourth embodiment of the invention, the longitudinal sectional shape of the protruded deformations is formed in a sine wave shape.

In a fifth embodiment of the invention, the longitudinal sectional shape of the protruded deformations is formed in a trapezoidal shape.

In a sixth embodiment of the invention, the protruded deformations are composed by fusing wires at specific pitches on the outer circumference of the base.

In a seventh embodiment of the invention, a shock absorber is provided at the lower outer edge of the base.

In an eighth embodiment of the invention, the prestressed concrete pavement is replaced by a structure, such as reinforced concrete pavement, having a thermal expansion and capable of burying and supporting an object in the concrete or the like in a state of constraint around the buried object.

In a ninth embodiment of the invention, the structure of the inset light in any one of the other embodiments is applied to a buried object other than the inset light.

BEST MODE FOR CARRYING OUT THE INVENTION

An embodiment of the invention is described below while referring to the accompanying drawings.

Figure 1:
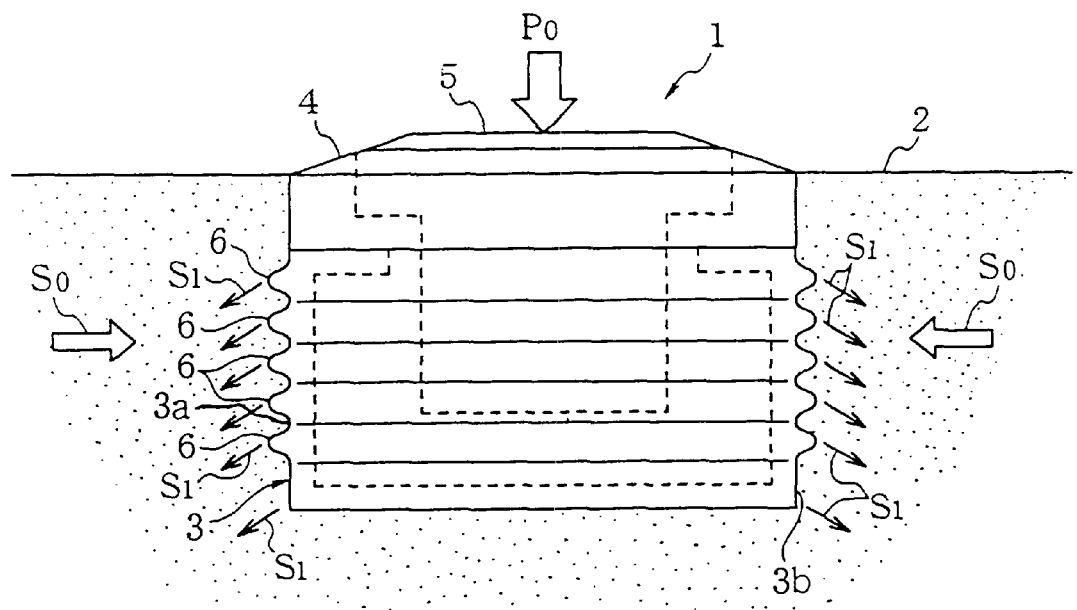
FIG. 1 is a side view of installed state of an inset light showing an example of an embodiment of the invention.

FIG. 1 is a side view of installed state of an inset light showing an example of an embodiment of the invention.

This inset light 1 is installed inside, for example, the runway in an airport, and is roughly composed of a metal cylindrical base 3 installed inside a PC pavement 2 composing the runway, and a lamp body 5 mounted on the top of the base 3 by way of a ring-shaped lamp body holding member 4. The base 3 is buried and fixed in the PC pavement 2 by placing concrete after being arranged together with the conduit pipe, PC steel plate and others at specified position on the existing pavement surface, and the lamp body holding member 4 and lamp body 5 are installed after fixing the base 3. Inside the base 3, the transformer and other power source circuits are provided, and the power is supplied through the power wires placed in the conduit pipe.

Figure 6:
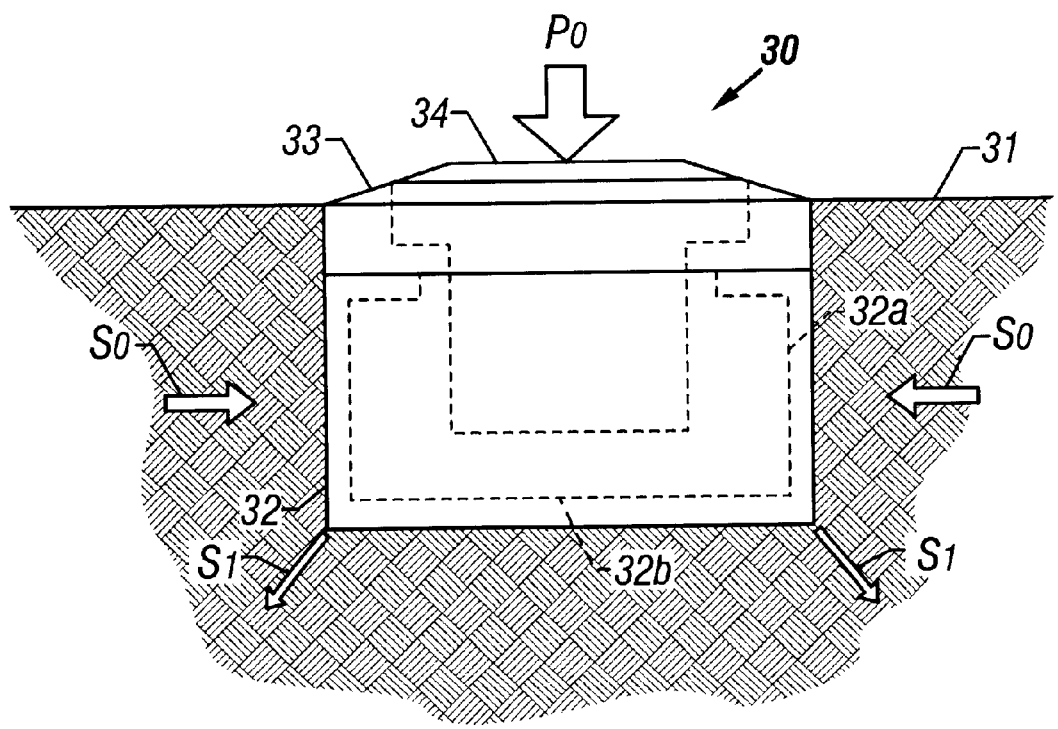
FIG. 6 is a side view of installed state of a conventional inset light.

This inset light 1 is similar to the conventional one shown in FIG. 6 in the structure of the lamp body holding member 4 and lamp body 5, but the structure of the base 3 is completely different from the conventional one. That is, in the conventional inset light, the outer circumference of the base 3 is a mere flat cylindrical body, but on the outer circumference 3a of the base 3 of this inset light 1, annular protruded deformations 6 are formed around the whole circumference at specified pitches, for example, at five positions along the vertical direction (axial direction). The shape and protruding length of individual protruded deformations 6 are the same.

Thus, by forming plural annular protruded deformations 6 on the outer circumference 3a of the base 3, integration of the PC pavement 2 and base 3 (engagement=increase of contact area) is promoted by the prestress $S_0$ occurring in the direction (nearly horizontal direction) of oppressing the outer circumference of the base 3 in the PC pavement 2. As a result, the load applied on the inset light 1 from above is dispersed (arrow $S_1$) not only into the portion contacting with the lower side of the base 3 of the PC pavement 2, but also in the portion contacting with the protruded deformations 6 on the outer circumference, so that the supporting force (push-through shearing resistance) around the base by the PC pavement 2 is extremely improved. Therefore, if a heavy load of aircraft or the like is applied, concentration of the load beneath the base 3 is prevented, and sinking can be prevented.

As shown in the example above, in principle, the annular protruded deformations 6 are formed to surround the entire outer circumference of the base 3, but they may be formed intermittently in part to such an extent as not to impede the dispersing effect of load by the protruded deformations 6. The forming positions of the protruded deformations 6 in the vertical direction are not necessarily five, but they may be formed at four positions or less, or six positions or more.

Figure 2:
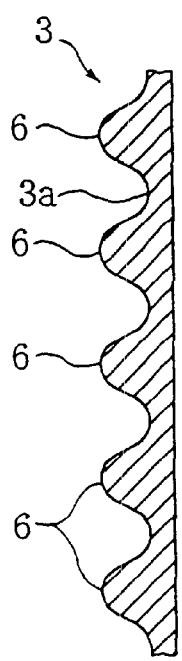
FIG. 2 is a partial sectional view showing an example of sectional shape of protruded deformations.
Figure 3:
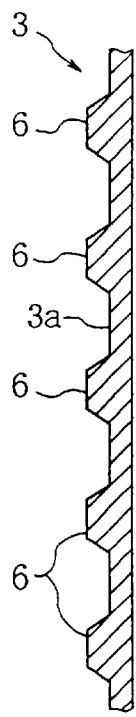
FIG. 3 is a partial sectional view showing an example of sectional shape of protruded deformations.

The sectional shape of the protruded deformations 6 may be either sine wave shape as shown in FIG. 2, or trapezoidal shape as shown in FIG. 3. The mutual intervals (pitches) of the protruded deformations 6 must be equal intervals. The protruded deformations 6 may be also formed continuously in a spiral shape.

Figure 4:
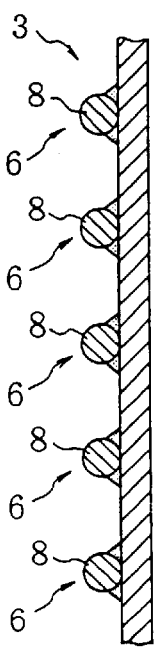
FIG. 4 is a partial sectional view showing an example of sectional shape of protruded deformations.

The forming method of the protruded deformations 6 is also free, including cutting and molding methods. Or, as shown in FIG. 4, wires 8 of steel material or the like may be welded to the outer circumference of the base 3.

In the inset light of embodiment 1 of the invention shown in FIG and others, since annular protruded deformations are set up at specific pitches at plural positions on the outer circumference of the cylindrical base, the bonding force of the base circumference and PC pavement is increased, and if a heavy load is applied downward from the aircraft, vehicle or other heavy object passing on the light, it is dispersed by the protruded deformations on the outer circumference of the base, and the holding force of the outer circumference of the base by the PC pavement contacting with the outer circumference of the base is enhanced, thereby preventing breakage and brittleness of the position of the PC pavement positioned beneath the base, and sinking of the lighting fixture.

Figure 5:
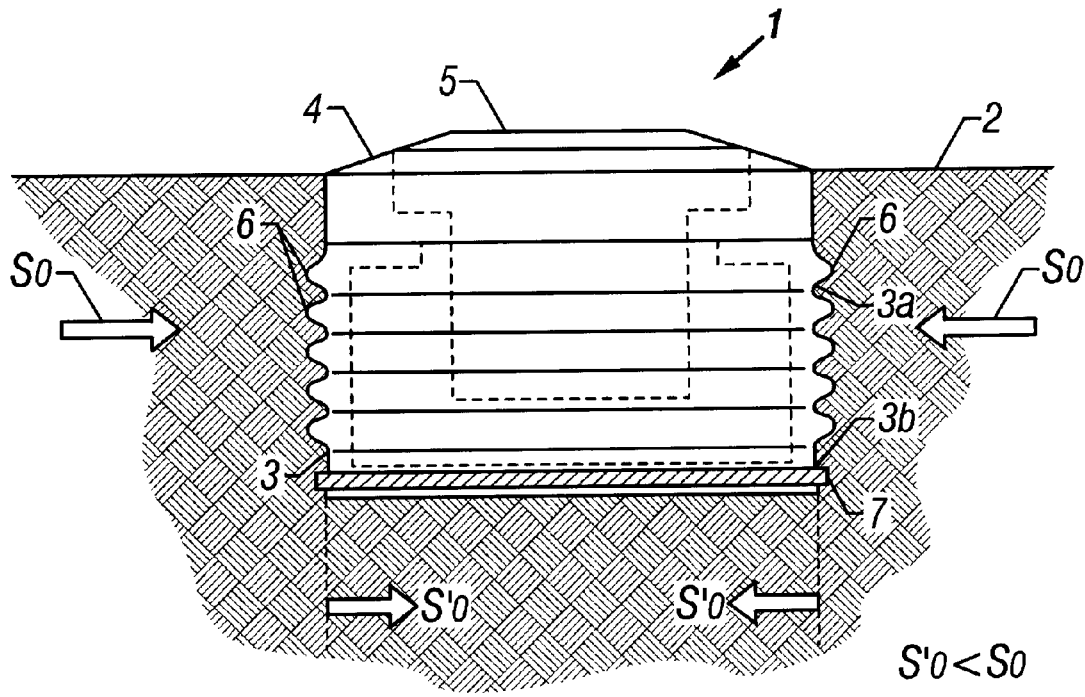
FIG. 5 is a sectional view of installed state of an inset light other embodiment of the invention.

FIG. 5 is a drawing showing an installed state of an inset light in other embodiment of the invention, and the lighting fixture 1 of this embodiment is characterized by the configuration in which an annular shock absorber (rubber, other elastic resin, or other elastic material) 7 is fixed to surround the entire circumference of a lower end outer peripheral edge 3b of the base 3.

The sectional shape of the shock absorber 7 may be rectangular as shown in the drawing, or may be semicircular or other shape. The shock absorber 7 is fixed by using adhesive or the like.

As in the prior art mentioned above, if the lighting fixture having a flat outer circumference is installed in PC pavement, the prestress $S_0$ applied from the PC pavement to the outer circumference of the base is canceled by the rigidity of the base, and by the replusive force of the lower end outer peripheral edge 3b of the base having the largest rigidity, the prestress to the PC pavement portion positioned beneath the base is decreased, and the concrete strength is lowered, which may lead to breakage or sinking of the lighting fixture.

The same problem occurs if the protruded deformations 6 are formed on the outer circumference of the base as in the embodiment in FIG. 1. That is, by disposing the protruded deformations 6, it is intended to enhance the bonding force between the PC pavement 2 and base outer circumference, and prevent sinking of the light due to heavy load applied downward on the top of the lighting fixture, but in this case, too, due to large rigidity of the lower end outer peripheral edge 3b of the base, the prestress on the concrete portion positioned beneath the base is canceled, and when a load is applied from above, cracking or sinking may occur due to bending stress.

To eliminate such inconvenience, in the embodiment shown in FIG. 5, the annular shock absorber 7 is provided to surround the entire circumference at the lower end outer peripheral edge of the base 3, and it suppresses occurrence of stress canceling the prestress $S_0$ of the PC pavement 2 in the lower portion of the base 3. That is, in this embodiment, the shock absorber 7 is disposed so as to lower the constraint force of the lower end outer peripheral edge, in order to prevent cancellation of the prestress $S_0$ due to replusive force of the lower end outer peripheral edge 3b having the largest rigidity of the base 3 so as to be hardly deformed.

That is, since the shock absorber 7 can suppress occurrence of stress canceling the prestress of the PC pavement positioned beneath the base, it exhibits the function of solving the problem of shortage of prestress of the PC pavement 2 in the lower portion of the base 3, and suppressing decline of strength. Therefore, even in the environment of repeated action of the heavy load of aircraft or other heavy object on the inset light, breakage and brittleness of the PC pavement 2 in the lower part of the base 3 cane suppressed, and subsequent sinking of the light can be prevented, so that the life of the inset light 1 and PC pavement 2 can be extended.

Moreover, by the presence of the shock absorber 7, it has been experimentally confirmed that the prestress to the protruded deformations 6 positioned above the shock absorber 7 is enhanced. Therefore, the shock absorber 7 further heightens the bonding force between the protruded deformations 6 and the PC pavement 2 contacting therewith, and the effect of dispersing the load from above can be further enhanced.

In principle, the shock absorber 7 is provided on the entire circumference of the base 3, but may be disposed intermittently as far as the specified function is not spoiled.

The foregoing embodiments relate to inset lights (including marker lights) installed in the runway in an airport, but the invention is not limited to these examples, but may be effectively applied in buried structures in various PC pavements subject to heavy loads, such as taxiway, apron and road in an airport.

In the embodiments, the inset light is described to be installed in the PC pavement 2, but, not limited to the PC pavement 2, the invention may be applied to general structures buried and supported in the concrete or the like having an expansive property and in a state of constraint around the light.

Also in the above embodiments, the inset light is buried and supported in the PC pavement 2, concrete or other structure, but the invention may be applied to other buried objects than the inset light, and the structure of the light explained in the embodiment may be applied in other buried objects than the lights and the same excellent effects can be obtained.

As explained herein, the invention brings about the following excellent effects.

According to the invention as set forth in the first through sixth embodiments, by forming the protruded deformations on the outer circumference of the base, integration of the PC pavement and the base outer circumference is promoted by the prestress occurring in the direction of oppressing the outer circumference of the base in the PC pavement, and therefore the load applied on the inset light from above is dispersed not only into the portion contacting with the lower side of the base of the PC pavement, but also into the portion contacting with the protruded deformations on the outer circumference, so that the supporting force of the PC pavement is extremely enhanced. Accordingly, if a heavy load such as aircraft is applied, concentration of the load in the lower part of the base is prevented, and occurrence of sinking can be prevented.

Also according to the invention as set forth in the seventh embodiment, in addition to the effects of the first and other embodiments, by attaching the shock absorber to the lower end outer peripheral edge of the base, since decrease of prestress of the PC pavement in the lower portion of the base is lightened, shortage of prestress of the PC pavement in the lower portion of the base is prevented, and lowering of strength is suppressed. Therefore, even in the environment of repeated action of heavy load of aircraft or the like on the inset light, brittleness of the PC pavement in the lower portion of the base can be suppressed, and the life of the inset light and PC pavement can be extended.

According to the invention as set forth in the eighth embodiment, instead of the prestressed concrete pavement, by using the structure of burying and supporting the buried object in the concrete or the like having an expansive state and in a state of constraint around the buried structure, such as reinforced concrete pavement, the scope of application can be expanded to structures other than the prestressed concrete pavement.

According to the invention as set forth in the ninth embodiment, since the structure of the inset light of the first through eighth embodiments is applied to buried objects other than the inset light, the foregoing effects are obtained in various buried objects.

What is claimed is:

1. An inset light comprising a cylindrical base installed inside a prestressed concrete pavement, and a lamp body held on the top of said base for emitting light out to the pavement surface, wherein protruded deformations are formed on the outer circumference of said base in order to receive the load applied on the lamp body from above at the prestressed concrete pavement around said base.

2. The inset light according to claim 1, wherein said protruded deformations have a function of dispersing the stress generated downward from the lower edge of said base by the load applied on said lamp body from above.

3. The inset light according to claim 1 or 2, wherein said protruded deformations are disposed at specific pitches along the axial direction of the base.

4. The inset light according to claim 1, wherein the longitudinal sectional shape of said protruded deformations is formed in a sine wave shape.

5. The inset light according to claim 1, wherein the longitudinal sectional shape of said protruded deformations is formed in a trapezoidal shape.

6. The inset light according to claim 1, wherein said protruded deformations are composed by fusing wires at specific pitches on the outer circumference of said base.

7. The inset light according to claim 1, wherein a shock absorber is provided at the lower outer edge of said base.

8. The inset light according to claim 2, wherein the longitudinal sectional shape of said protruded deformations is formed in a sine wave shape.

9. The inset light according to claim 3, wherein the longitudinal sectional shape of said protruded deformations is formed in a sine wave shape.

10. The inset light according to claim 2, wherein the longitudinal sectional shape of said protruded deformations is formed in a trapezoidal shape.

11. The inset light according to claim 3, wherein the longitudinal sectional shape of said protruded deformations is formed in a trapezoidal shape.

12. The inset light according to claim 2, wherein said protruded deformations are composed by fusing wires at specific pitches on the outer circumference of said base.

13. The inset light according to claim 3, wherein said protruded deformations are composed by fusing wires at specific pitches on the outer circumference of said base.

14. The inset light according to claim 2, wherein a shock absorber is provided at the lower outer edge of said base.

15. The inset light according to claim 3, wherein a shock absorber is provided at the lower outer edge of said base.

16. The inset light according to claim 4, wherein a shock absorber is provided at the lower outer edge of said base.

17. The inset light according to claim 5, wherein a shock absorber is provided at the lower outer edge of said base.

18. The inset light according to claim 6, wherein a shock absorber is provided at the lower outer edge of said base.

19. An inset light comprising a cylindrical base installed inside a reinforced concrete pavement, and a lamp body held on the top of said base for emitting light out to the pavement surface, wherein protruded deformations are formed on the outer circumference of said base in order to receive the load applied on the lamp body from above at the reinforced concrete pavement around said base.

\* \* \* \* \*